United States Patent [19]  
Hassan

[11] Patent Number: 4,804,169  
[45] Date of Patent: Feb. 14, 1989

[54] COMPOSITE JOUNCE BUMPER FOR VEHICLE SUSPENSION STRUT  
[75] Inventor: Morris Hassan, Trenton, Mich.  
[73] Assignee: Chrysler Motors Corporation, Highland Park, Mich.  
[21] Appl. No.: 179,736  
[22] Filed: Apr. 11, 1988  
[51] Int. Cl.⁴ .............................................. F16F 13/00  
[52] U.S. Cl. ..................... 267/220; 267/33; 267/293; 280/668; 280/710  
[58] Field of Search ................. 267/33, 140, 152, 153, 267/195, 219, 220, 258, 292, 293, 294; 280/668, 710, 712

[56] References Cited  
U.S. PATENT DOCUMENTS  
3,412,990 11/1968 Gladstone ............................ 267/220  
4,248,454 2/1981 Cotter et al. ........................ 280/668  
4,434,977 3/1984 Chiba et al. ..................... 267/152 X  
4,681,304 7/1987 Hassan .

Primary Examiner—George E. A. Halvosa  
Attorney, Agent, or Firm—Edward P. Barthel

[57] ABSTRACT

An improved deflection composite jounce bumper for a vehicle suspension strut. The bumper comprises an inverted metal cup-shaped shell insert embedded within a molded elastomeric body. The body defines a hollow elongated sleeve portion which surrounds a piston rod upper end with its upper portion in turn concentrically surrounded by the annular side wall of the shell. The sleeve portion has a predetermined height such that upon its lower end face impacting on the strut support casing upper end cap an initially high spring dampening rate is achieved. The shell outer side wall is operative to restrict the expansion of the sleeve portion as it undergoes progressive controlled deformation and compaction providing a substantially uniform spring rate while obviating over stressing of the jounce bumper.

5 Claims, 2 Drawing Sheets

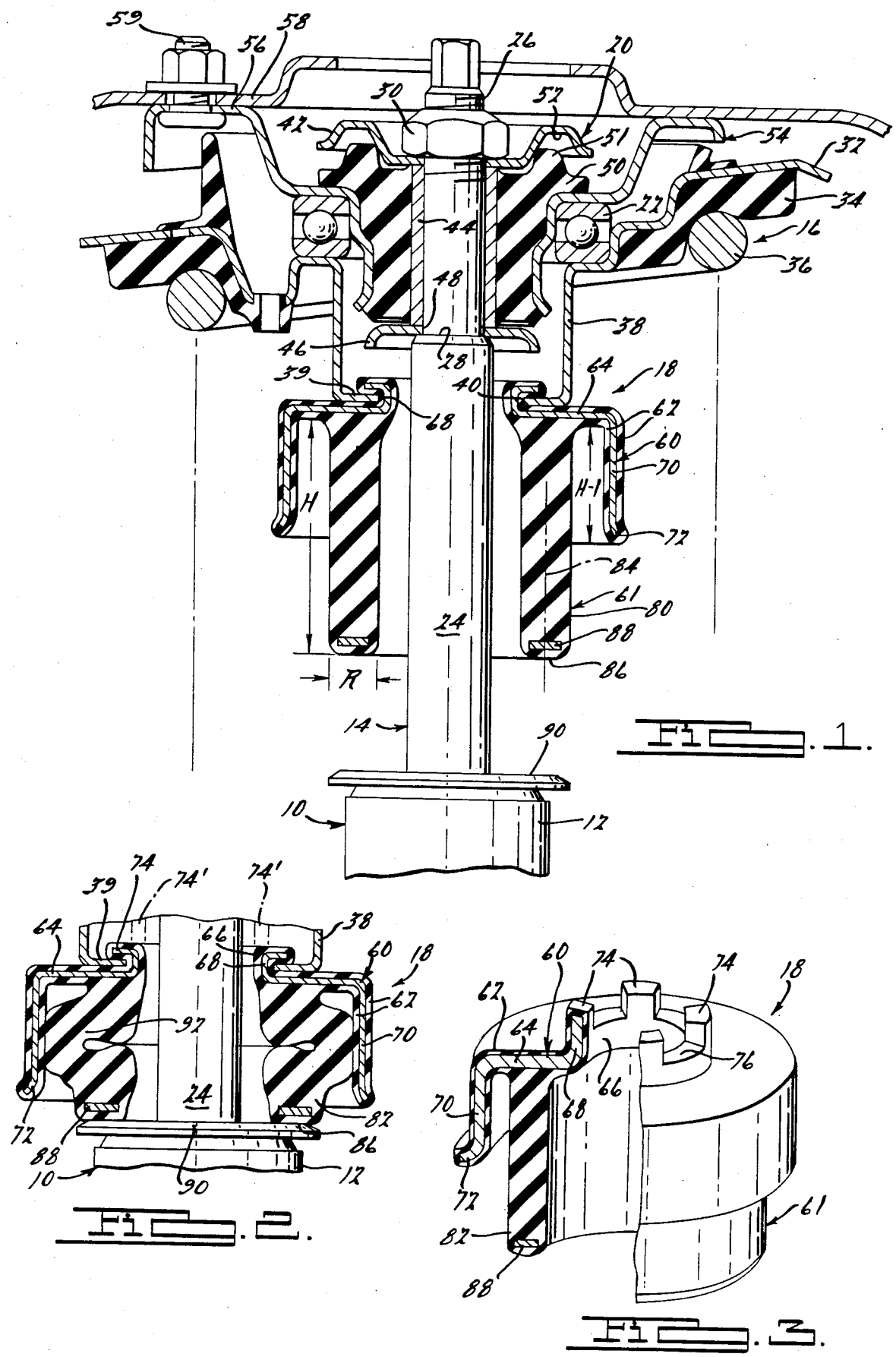

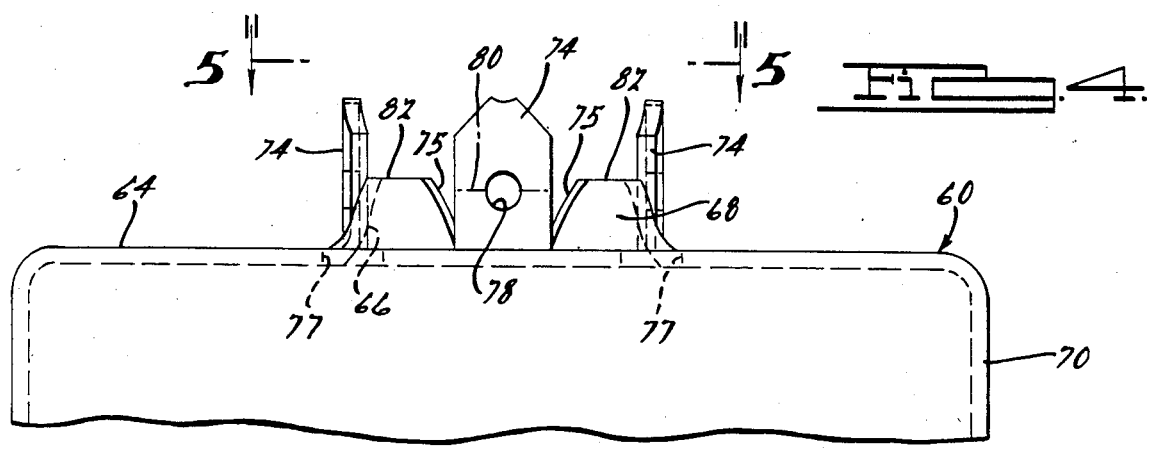
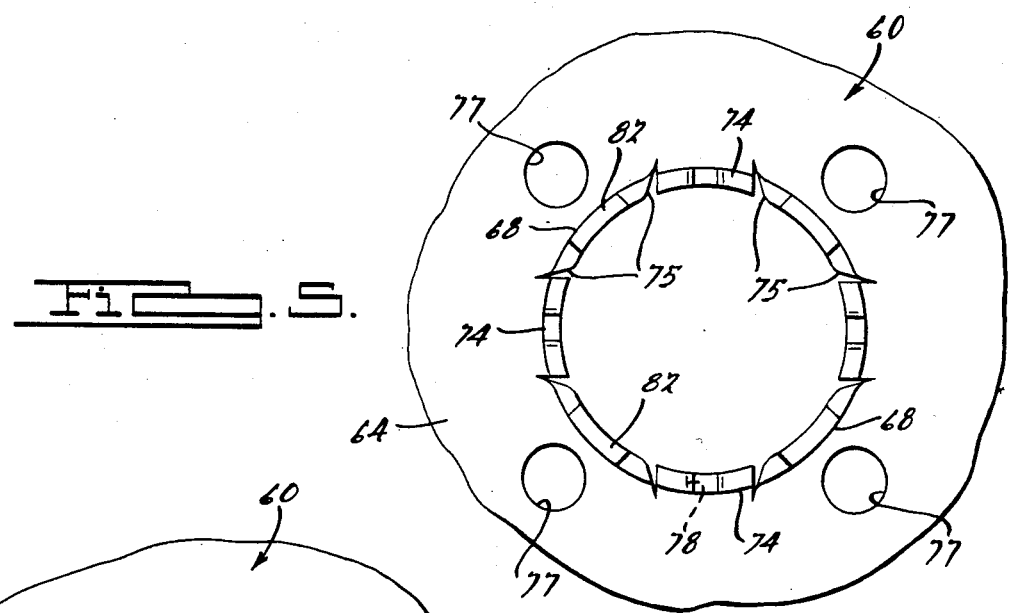
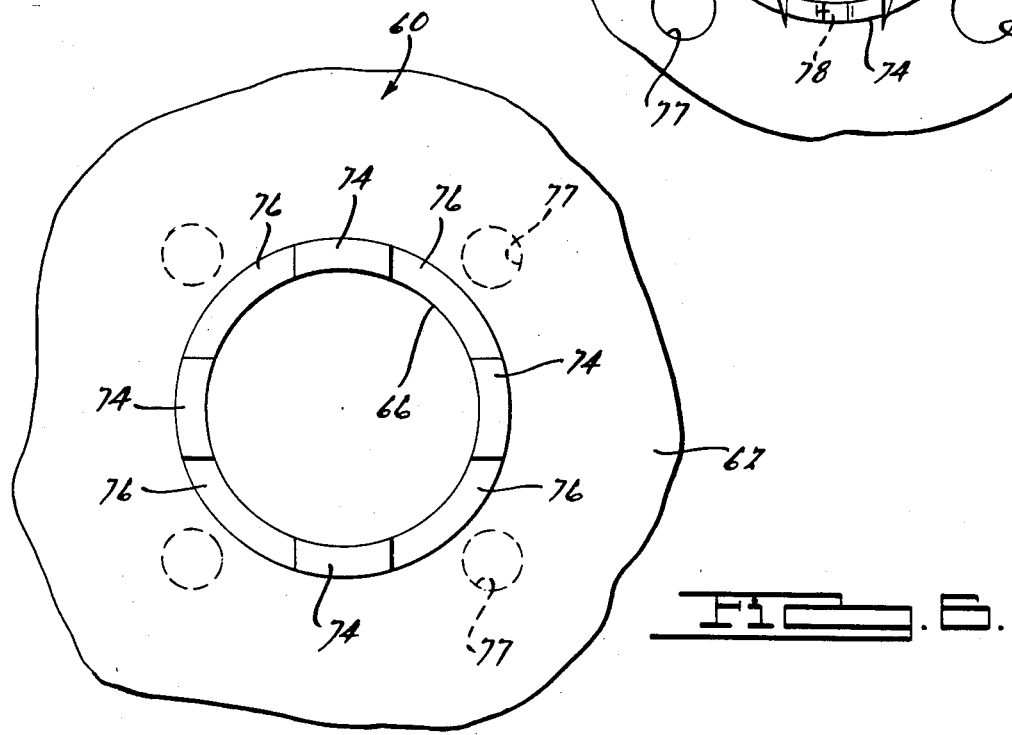

COMPOSITE JOUNCE BUMPER FOR VEHICLE SUSPENSION STRUT

BACKGROUND OF THE INVENTION

This application relates to Ser. No. 179,721 filed Apr. 11, 1987.

This invention relates to automotive suspensions and more particularly to a composite jounce bumper assembly for a suspension strut providing a controlled spring rate.

The U. S. Pat. No. 4,681,304 issued July 21, 1987, to M. Hassan and entitled Deflection Jounce Bumper For Strut Suspension discloses a jounce bumper having initially high dampening load displacement resistance. A generally cylindrical shaped elastomeric bumper is provided having a solid upper hub portion encircling the strut piston rod. A lower impact portion of the Hassan bumper has outer and inner concentric wall portions defining an intermediate downwardly opening channel. The wall sections are interconnected by a plurality of integral column-like arcuate bridging segments defining therebetween an axial blind bore. Upon the bumper being impacted the wall sections together with the bridging segments stretch to absorb impact energy thereby achieving the initially high dampening load displacement resistance. The jounce bumper of the '304 patent is expensive to manufacture and has a limited service life.

The U. S. Pat. No. 4,434,977 issued Mar. 6, 1984 to Chiba et al. discloses a strut type suspension for a vehicle. The Chiba et al. patent is an example of a prior art bumper or pad fitted onto a piston rod which functions to dampen and limit the action of the shock absorber when it bounds. The Chiba et al. bumper is formed with an inverted frusto-conical configuration such that in a jounce stroke it functions in pure compression upon being impacted by the upper end of the piston rod outer casing.

SUMMARY OF THE INVENTION

It is an object of the present invention to provide a composite jounce bumper for a motor vehicle suspension shock absorber mount assembly having an outer casing and a piston rod extending out of its upper end wherein the jounce bumper is adapted to provide a soft initial impact on the shock outer casing upper end so as to achieve both sufficiently high initial spring rates together with an overall minimal compressive height.

It is another object of the present invention to provide a composite jounce bumper as set forth above which is adapted to be connected to the mount and comprises a cylindrical shaped hollow elastomeric sleeve portion supported concentrically within a cup-shaped shell wherein the elastomeric sleeve portion surrounds the piston rod upper end and has a predetermined height such that upon its lower end face impacting on the casing upper end the sleeve achieves an initially high spring dampening rate while the shell being operative to restrict the expansion of the elastomeric sleeve as it undergoes progressive controlled deformation and compaction obviating over stressed areas.

It is still another object of the present invention to provide a composite jounce bumper as set forth above wherein the cup-shaped shell is a metal insert embedded in an elastomeric jounce bumper body with the insert including an upper closed end wall portion formed with a central passage defined by an upwardly extending cylindrical neck portion of a size and shape to closely fit within a strut mount aperture. The insert neck portion terminates in a plurality of upwardly extending tongues adapted to be inserted through a mount aperture and bent outwardly thereby readily securing the composite jounce pumper to the strut mount.

These and other objects and features of the invention will become apparent to those skilled in the vehicle suspension arts upon reading the following detailed description with reference to the accompanying drawings in which:

BRIEF DESCRIPTION OF THE DRAWINGS

FIG. 1 is a front view, partly in section, of the upper portion of a vehicle suspension strut embodying the composite jounce bumper of the present invention;

FIG. 2 is fragmentary view, partly in section, of the composite jounce bumper in its maximum compressed mode;

FIG. 3 is a detail perspective view of the composite jounce bumper with portions broken away showing the encapsulated metal shell and restraining ring;

FIG. 4 is an enlarged fragmentary detail front view of the metal shell portion of the subject composite jounce bumper;

FIG. 5 is a fragmentary top view taken in the direction of line 5—5 of FIG. 4, and FIG. 6 is a fragmentary view similar to FIG. 5.

DESCRIPTION OF THE PREFERRED EMBODIMENT

Referring now to FIG. 1 of the drawings, a suspension strut of the type generally employed, for example, in a MacPherson independent wheel suspension system is partially illustrated at 10. The suspension strut 10 comprises a tubular housing assembly having an outer casing 12, a cylindrical piston rod member 14 received in the upper end of the casing 12, a helical suspension spring 16, a composite jounce bumper 18, a rebound bumper assembly 20, and a ball thrust bearing assembly 22.

The tubular housing assembly and the piston rod 14 cooperate in a known manner to function as a hydraulic spring action modifier in a vehicle suspension system. Adjacent the lower end of the housing assembly casing 12 is a mounting plate (not shown) whereby the strut 10 may be secured to the wheel assembly of a vehicle. Reference may be had to U. S. Pat. No. 4,256,292 issued Mar. 17, 1981 to Sullivan et al. for details of a typical strut mounting plate and vehicle road wheel. The disclosure of the '292 patent is hereby incorporated by reference herein.

FIG. 1 shows the piston rod 14 as including a lower smooth portion 24 telescopically received in the housing assembly outer casing 12 and an upper threaded portion 26. An upwardly facing shoulder 28 is formed between the lower and upper rod portions 24 and 26. A nut 30 is threadingly received on the upper threaded rod portion 26 for making portions of the helical spring 16, the composite jounce bumper 18, and the rebound bumper assembly 20 axially fast against the shoulder 28.

The helical spring assembly 16 includes an upper canted spring seat member 32, having an elastomeric backing 34 bonded to the underside thereof, a lower spring seat member (not shown), and a helical spring 36. For details of a conventional lower spring seat member reference may be made to U. S. Pat No. 4,248,454 the disclosure of which is incorporated by reference herein. The upper seat member 32 includes a downwardly extending cup-shaped portion 38 having a bottom or horizontal plate portion 39 formed with a central circular aperture 40 through which the piston rod portion 24 extends in a spaced concentric manner.

The rebound bumper assembly 20 includes an upper rebound retainer 42, a rebound bumper sleeve 44, and a lower rebound retainer 46. The lower rebound retainer 46 has an aperture 48 sized to permit assembly over the threaded rod portion 26 to the position abutting the shoulder 28. A rebound bumper ring 50 is formed on the sleeve 44 and presents an annular raised surface 51 for reception in inverted channel 52 formed in upper ring 42. The ball thrust bearing assembly 22 is positioned between rebound mounting plate 54 and the upper seat member 32. Flat outer flange 56 of the mounting plate 54 is secured to the vehicle body structure 58 by suitable fasteners such as the bolt and nut 59.

The composite jounce bumper 18 of the present invention comprises a rigid inverted cup-shaped shell insert, generally indicated at 60, embedded within a generally cylindrical body 61 of molded flexible elastomeric material. The shell insert 60, preferably stamped from sheet metal, is enveloped within an upper portion of the body 61 defined by inner, outer, and edge surfaces with a moisture-tight sealing uniform layer or coating portion 62 of the body elastomeric material. In the preferred embodiment the elastomeric material is natural or synthetic rubber. The body upper coating portion 62 which surrounds the shell insert 60 has vibration-insulating properties together with protective sealing.

As seen in FIG. 3 the composite shell insert 60 comprises an upper closed end wall coated portion 64 formed with a central rod passage 66 defined by coated neck portion 68. The shell insert 60 has an annular outer vertical or right-cylindrical wall portion 70 the principal axis of which is coincident with the center of the passage 66. It will be noted that the wall portion 70 terminates in an outwardly radiused or rolled lip portion 72. With reference to FIGS. 3 and 4 the neck portion 68 is formed with a plurality of axially extending tongues which in the disclosed embodiment comprise four integral tongues 74 lanced therefrom. The tongues 74 are equally spaced at ninety degree intervals around the neck portion 68 defining V-shaped slots 75 on either side thereof. It will be noted in FIGS. 3 and 6 that upon the insert 60 being enveloped in the elastomeric material a U-shaped recess 76 is defined between adjacent pairs of tongues 74. Further, a series of holes 77 are provided in the insert 60 to allow passage therethrough of the elastomeric material during the molding or encasing of the insert 60 in the elastomeric material.

As seen in FIG. 4 each of the tongues 74 is machined with a forming hole 78 located with its center on diametrical construction line 80 aligned substantially on the upper edges 82 of the intermediate frusto-conical shaped neck portion 68. It will be appreciated that the shell insert 60 in FIGS. 4 and 5 is shown prior to being embedded in the elastomeric body portion 61.

The coated neck portion 68 is of a size and shape to closely fit within the lower mount bottom portion 39 aperture 40 with the four tongues 74 initially extending vertically as seen in dashed lines 74' of FIG. 2. The coated shell insert 60 is thus readily secured to the mount lower seat portion 38 by bending the tongues 74 outwardly to their full-line positions 74 overlying lower seat bottom portion 39.

The composite jounce bumper body 61 further comprises a cylindrical shaped annular rubber sleeve portion 82 shown in FIG. 1 concentrically encircling the piston rod lower portion 24 in a radially spaced manner. It will be noted that the body lower sleeve portion 82 is shown molded integral with the body upper coating portion 62. The rubber material is designed with a predetermined durometer number dictated by the range of jounce forces to which the shock absorber 10 will be subjected. Further, the body sleeve portion 82 has a predetermined radial thickness "R" and axial height "H" conforming with the particular rubber material selected.

The sleeve portion 82 has its medial cylindrical axis, defined by construction line 84, positioned substantially intermediate the shell outer wall portion 70 and the inner piston rod portion 24. It will be further noted that the height "H−1" of the shell side wall portion 70 is about one-half the height "H" of the sleeve portion 61.

Circular retaining ring means is shown embedded in the sleeve portion 82 adjacent its lower end face 86 for a reason to be explained below. In the disclosed embodiment the retaining ring means is a single metal washer-like flat ring 88 concentrically molded or embedded within the sleeve portion 61.

Thus, in operation during severe jounce loads the shock absorber support casing 12 upper end closure plate or cap, shown at 90 in FIG. 2, initially impacts the lower end face 86 of the sleeve portion. This initial impact is substantially absorbed by the column effect of the sleeve portion 61 assisted by the embedded control ring 88 providing a high initial spring or load/deflection rate and thus high early dampening of the shock jounce load. As a result there is minimal axial travel of the piston rod 14 while the composite jounce bumper does more useful spring dampening work over a longer period of time while maintaining a column-like effect. Thus, a minimal compressed height is achieved by the composite jounce bumper 18 to smoothly absorb the impact energy of the shock loads.

Upon the sleeve portion 82 being further compressed by larger jounce strokes it achieves a substantially uniform spring constant or rate. This is true because as the rubber sleeve portion 82 is further stressed it loses its column-like shape and tends to buckle outwardly at an intermediate section, as seen at 92 in FIG. 2. Such outward buckling is restricted in a controlled manner by the interior body layer 62 of the shell insert outer coated wall portion 70.

It will be appreciated that the control ring 88 insures the predetermined buckling pattern shown by preventing outward radial movement of the sleeve portion lower end 86. Further, the service life of the composite jounce bumper 18 is greatly enhanced by virtue of applicants' unique arrangement.

While a preferred embodiment has been shown and described to illustrate the invention, other embodiments will become to those skilled in the art. Accordingly, the scope of his invention is set forth in the following claims.

What is claimed is:

1. A composite jounce bumper for a vehicle suspension strut comprising a shock absorber having an outer casing and a piston rod extending out of its upper end, means connecting said casing to the vehicle unsprung mass, an upper mount connecting the upper end of said piston rod to the vehicle sprung mass, said upper mount including a transverse plate portion having a central aperture therein receiving said piston rod therethrough in a spaced concentric manner, and means connecting the upper end of said piston rod to said sprung mass, said composite jounce bumper comprising:

- a rigid inverted cup-shaped shell insert embedded within a body of molded flexible elastomeric material such that said shell insert is provided at its inner and outer surfaces with a layer of said elastomeric body;
- said cup-shaped shell insert having a transverse upper closed end portion and an annular outer side wall portion concentric with said piston rod;
- said shell insert upper closed end portion formed with an upwardly extending neck portion of an external size and shape to closely fit within said upper mount aperture,
- said neck portion defining an internal piston rod passage which terminates in a plurality of attaching tongues extending vertically upwardly through said mount aperture with said tongues adapted upon insertion through said mount aperture to be bent upon a transverse line outwardly to overlie said mount thereby retaining said shell neck portion within said mount aperture;
- said elastomeric body further defining a cylindrical shaped annular hollow sleeve portion extending axially downwardly from said insert closed end portion inner body layer, said sleeve portion concentrically encircling the piston rod and radially spaced intermediate said insert annular side wall portion and said piston rod;
- said sleeve portion having retaining ring means embedded therein adjacent its lower end;
- said hollow sleeve portion defining a predetermined height such that its lower end face is positioned a determined axial distance above the casing upper end with said strut in its neutral vehicle height position;
- whereby upon said sleeve portion lower end face being initially impacted the resulting impact is substantially absorbed by the column effect of said sleeve portion assisted by said embedded control ring means providing a high initial spring rate and thus high early damping of the shock jounce loads with minimal axial compression travel of the piston rod; and
- whereby upon said sleeve portion being further compressed the resultant stress causes an intermediate portion of said sleeve to buckle outwardly, and wherein such outward movement is restricted in a controlled manner by said insert shell annular outer side wall thereby achieving a substantially uniform spring rate adjacent the end of said piston rod compression travel.

2. The composite jounce bumper as set forth in claim 1, wherein said elastomeric material is rubber.

3. The composite jounce bumper as set forth in claim 1, wherein said sleeve portion having a height about twice the vertical extent of said insert side wall portion.

4. The composite jounce bumper as set forth in claim 1, wherein each said attaching tongue having a weakening hole formed therein allowing ready outward bending thereof.

5. The composite jounce bumper as set forth in claim 1, wherein said retaining ring means in the form of a single flat washer-like metal ring.

* * * * *